United States Patent [19]

Saji et al.

[11] Patent Number: 4,887,404
[45] Date of Patent: Dec. 19, 1989

[54] TRANSLUCENT GLASS BRICK MADE OF OPAL GLASS WITH LIGHT DIFFUSIBLE CRYSTAL PARTICLES

[75] Inventors: Kosaburo Saji, Nagahama; Shigeru Yamamoto, Kyoto; Katsuhiko Imai, Otsu, all of Japan

[73] Assignee: Nippon Electric Glass Company, Limited, Otsu, Japan

[21] Appl. No.: 206,713

[22] Filed: Jun. 14, 1988

[30] Foreign Application Priority Data

Jun. 16, 1987 [JP] Japan ............................ 62-149588
Jun. 17, 1987 [JP] Japan ............................ 62-150539

[51] Int. Cl.⁴ .................... E04B 5/46; E04C 1/42; B22B 17/06
[52] U.S. Cl. ......................... 52/306; 52/311; 428/426; 428/428
[58] Field of Search ................... 52/306–308, 52/311; 428/34, 410, 426–428

[56] References Cited

U.S. PATENT DOCUMENTS

| | | | |
|---|---|---|---|
| 2,768,556 | 10/1956 | Boyd | 52/306 |
| 4,038,448 | 7/1977 | Boyd et al. | 428/427 X |
| 4,062,996 | 12/1977 | Keafer, Jr. et al. | 428/426 X |
| 4,318,946 | 3/1982 | Pavone | 52/311 X |
| 4,726,981 | 2/1988 | Pierson et al. | 428/426 X |

Primary Examiner—Richard E. Chilcot, Jr.
Attorney, Agent, or Firm—Kurt Kelman

[57] ABSTRACT

A translucent glass brick for use in a building wall as a lighting wall is made of a translucent opal glass in a form of a hollow glass block. The opal glass has an opal appearance and a mean light transmittance of 20–80%, in a glass thickness of 10 mm, for wavelength over a range of 400–700 nm. The opal glass is a lime and chlorine free glass with sodium sulfate and sodium sulfide fine particles dispersed therein for diffusing light transmitting through the glass. The opal glass essentially consists, by weight, of $SiO_2$ 60.0–70.0%, $Al_2O_3$ 7.0–11.0%, $B_2O_3$ 1.0–5.0%, BaO 0–3.0%, ZnO 1.0–5.0%, $Na_2O$ 15.0–21.0%, $SO_3$ 0.3–1.0%, and $F_2$ 0–2.0%.

4 Claims, 4 Drawing Sheets

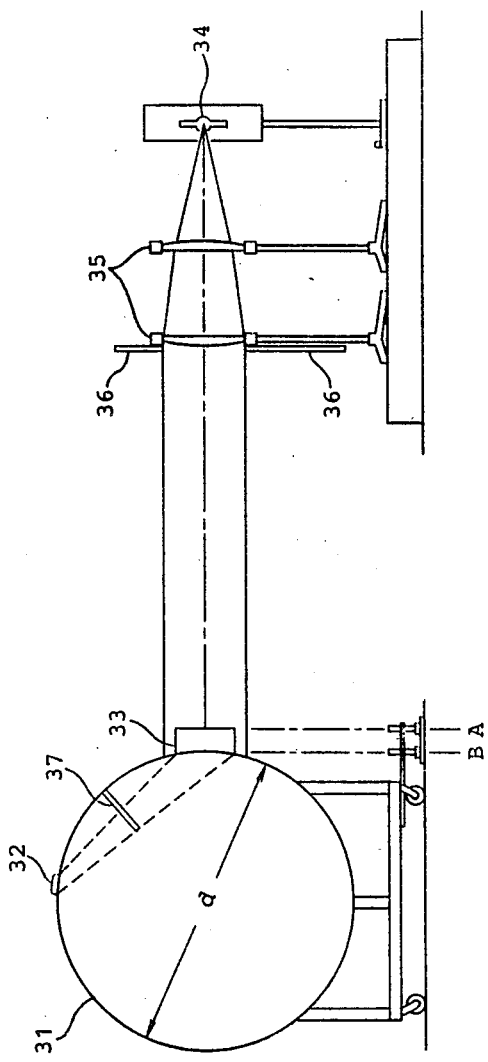
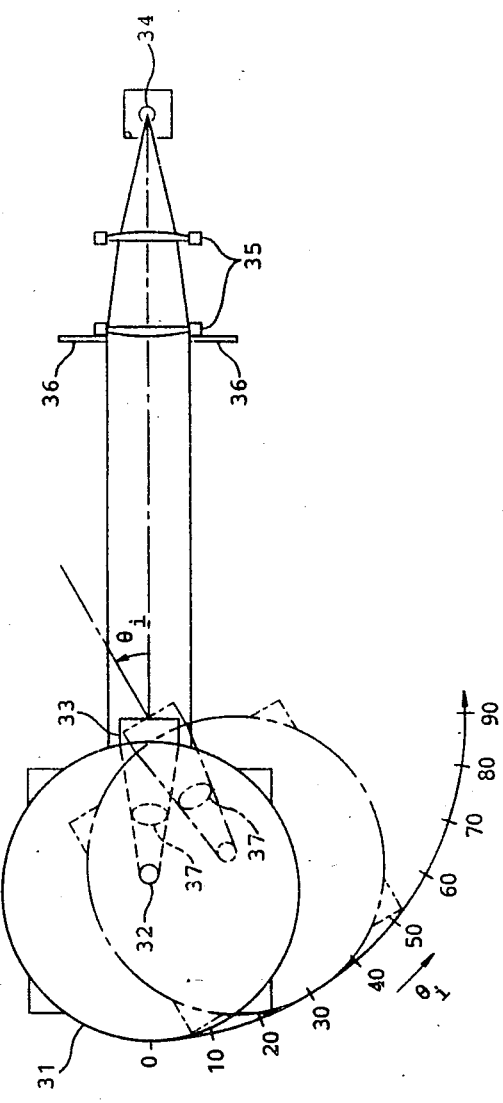
FIG. 4
FIG. 5

TRANSLUCENT GLASS BRICK MADE OF OPAL GLASS WITH LIGHT DIFFUSIBLE CRYSTAL PARTICLES

BACKGROUND OF THE INVENTION (1) Field of the Invention

The present invention relates to building glass materials and, in particular, to glass bricks or hollow glass blocks which are hollow bodies of glass used in building walls.

(2) Description of the Prior Art

Those glass bricks or hollow glass blocks are known as building wall materials in the prior art, as described in, for example, BRITISH STANDARD 1207:1961 (Reference 1). That is, the glass bricks are used for walls separating the inside and the outside of buildings as lighting walls, and are also used for partitions in rooms.

Those glass bricks are conventionally formed of light transparent glass such as soda-lime-silica glass. Each of the glass bricks has an inner hollow space and is formed in a generally rectangular hollow body. Further, the glass brick is usually formed with a rugged pattern in an inner surface of the hollow body so as to diffuse or scatter a light ray transmitting from one side of the glass brick to the opposite side through the glass brick in various directions. As a result, an inside room separated from the outside by the glass brick wall is generally uniformly lighted by an external light transmitted through and diffused or scattered by the glass bricks.

However, when the glass brick wall is exposed to direct sunlight, each of bricks often glares or glitters at the rugged pattern undesirably and makes a dazzle light for persons in the room. Furthermore, when a light incident angle to the brick increases, the refraction due to the rugged pattern is reduced so that the light scatter or diffusibility is not effectively performed.

SUMMARY OF THE INVENTION

Therefore, it is an object of the present invention to provide a translucent glass brick which is excellent in light scatter or diffusibility and appropriate in light transmittance without glaring or glittering to make a dazzling light even on exposure to direct sunlight.

It is another object of the present invention to provide such a glass brick which is excellent in chemical resistance.

As described above, a translucent glass brick is used in a building wall and is a hollow body of glass. According to the present invention, the translucent glass brick is made of an opal glass which comprises transparent glass matrix and fine particles dispersed in said matrix. The glass has an opal appearance and a mean light transmittance of 20–80% (preferably 30–80%), in a glass thickness of 10 mm, for wavelength over a range of 400–700 nm. In use of the glass brick of the present invention, the light ray transmitting through the glass brick is diffused by the fine particles in the glass in various directions so that the undesired glare is effectively removed.

In one aspect of the present invention, the opal glass is a lime free and chlorine free glass with the fine particles of sodium sulfate and sodium sulfide crystals. Those fine particles have an average particle size of 2.5–10 μm.

An example of the lime free and chlorine free 20 glass essentially consists, by weight, of $SiO_2$ 60.0–70.0%, $Al_2O_3$ 7.0–11.0%, $B_2O_3$ 1.0–5.0%, $BaO$ 0–3.0%, $ZnO$ 1.0–5.0%, $Na_2O$ 15.0–21.0%, $SO_3$ 0.3–1.0%, and $F_2$ 0–2.0%.

BRIEF DESCRIPTION OF THE DRAWINGS

FIG. 4 is a front view of an apparatus used for measuring light transmittance response to variation of light incident angle of the glass brick;

FIG. 5 is a plan view of the apparatus of FIG. 4; and

DESCRIPTION OF THE INVENTION

Figure 1:
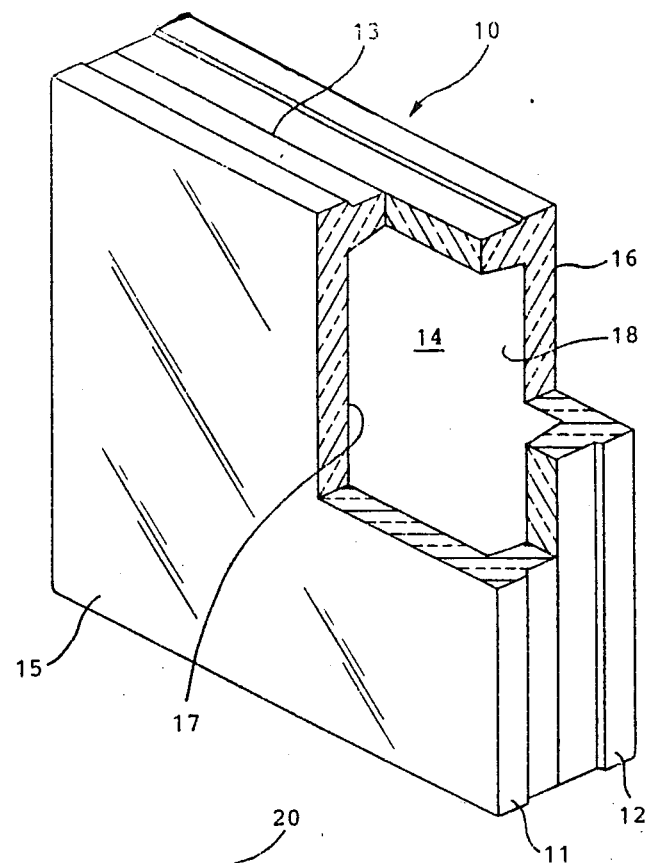
FIG. 1 is a partially exploded perspective view of a glass brick for illustrating a typical construction of the glass brick.

Referring to FIG. 1, a glass brick 10 comprises two like glass bodies 11 and 12 each being formed in a rectangular shallow cup shape. The cup-shaped glass bodies are joined to each other by a fusing method at an opening edge 13 of each cup to form a rectangular hollow glass block as the glass brick with a sealed-off hollow inner space 14.

In the prior art, the glass brick is made of a light transparent soda-lime-silica glass and have patterns in opposite outer side surfaces 15 and 16 and/or opposite inner side surfaces 17 and 18 to diffuse a light ray transmitting through the glass brick 10.

Figure 2:
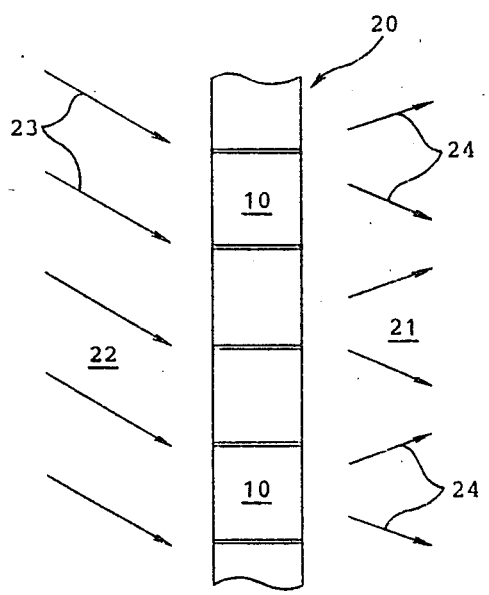
FIG. 2 is a side view of a brick wall formed by use of a plurality of glass bricks of FIG. 1 for diagrammatically illustrating diffusibility of the glass bricks.

Referring to FIG. 2, a plurality of glass bricks 10 are arranged in a matrix form to form a panel 20 which is used as a wall separating a room 21 from the outside 22. A light ray is incident to an external surface of the brick wall 20 from the outside 22 as shown by arrows 23 and then transmits into the room 21 through the wall 20. At the time, the incident light ray is diffused at the patterns in various directions as shown by arrows 24 so that the whole interior of the room is illuminated by the diffused light.

Briefly stating, the present invention attempts to use, so called, an opal glass for the glass brick. The opal glass has a plurality of fine particles dispersed in a glass matrix. Therefore, the fine particles diffuse the light ray transmitting therethrough in various directions without forming any pattern in the interior surfaces and/or exterior surfaces of the glass brick. The opal glass has a great deal of fine particles each of which functions to diffuse the light. Therefore, it will be understood that the glass brick of the opal glass is excellent in diffusibility and in reduction of glare more than the conventional glass brick having the patterns. The glass brick should have a light transmittance such as 20–80%, preferably 30–80% in comparison with conventional opal glass so that the brick can provide a lighting wall.

Various opal glasses are known and used as glass materials for tablewares and containers for toilet goods and medicine in the prior art.

JP-A-5040610 (KoKai Tokkyo Sho 50-40610, Reference 2) and JP-A-5051513 (Kokai Tokkyo Sho 50-51513, Reference 3) disclose opal glass wherein CaO and $P_2O_5$ particles are dispersed in soda-lime-silica glass. The opal glass is opaque and is used for toilet containers.

JP-A-53125418 (Kokai Tokkyo Sho 53-125418, based on U.S. patent application Ser. No. 784156 filed on Apr. 4, 1977, Reference 4) discloses opal glass which is opaque and is used for tablewares and cooking wares. The glass is soda-alumino-silicate glass in which fluoride particles such as NaF and $SrF_2$ are dispersed. Similar opal glass is also disclosed as glass for tablewares and flower vases in JP-A-5696746 (Kokai Tokkyo Sho 56-96746, based on U.S. patent application Ser. No. 103334 filed on Dec. 13, 1979, Reference 5).

JP-A-5654246 (Kokai Tokkyo Sho 56-54246, Reference 6) and JP-A-5659639 (Kokai Tokkyo Sho 56-59639, Reference 7) disclose opal glass wherein $CaSO_4$ and $BaSO_4$ particles are dispersed in soda-lime-silica glass.

Known opal glasses as shown in these references 2-7 have a low light transmittance such a less than 20%. Therefore, those known opal glasses are not sufficient for the glass brick in the light transmittance and many of them are not translucent but opaque.

An example of a glass of the opal glass having a sufficient light transmittance is shown in Table 1.

TABLE 1

| Ingredients | wt % | Ingredients | wt % |
|---|---|---|---|
| $SiO_2$ | 60.0–70.0 | $Al_2O_3$ | 7.0–11.0 |
| $B_2O_3$ | 1.0–5.0 | BaO | 0–3.0 |
| ZnO | 1.0–5.0 | $Na_2O$ | 15.0–21.0 |
| $SO_3$ | 0.3–1.0 | $F_2$ | 0–2.0 |

The opal glass contains sodium sulfide and sodium sulfate as crystal particles for diffusing light transmitting through the glass. Those fine particles have an average particle size of 2.5–10 μm.

$SiO_2$ is a main element of the glass. Use of $SiO_2$ less than 60.0% makes the chemical resistance of the glass insufficient. While, $SiO_2$ of an amount of more than 70.0% increases a viscosity at a high temperature and reduces a melting property.

When an amount of $Al_2O_3$ is less than 7.0%, the glass does not have a sufficient chemical durability. Use of $Al_2O_3$ more than 11.0% increases a viscosity of the glass at a high temperature and reduces a melting property.

$B_2O_3$ is used as a flux for lowering a viscosity of the glass and making it easy to melt the glass and also used as an agent for grading up the chemical resistance of the glass. If an amount of $B_2O_3$ is less than 1.0%, those functions as the flux and the agent are not realized so that an outer surface of the glass tends to be clouded to white with a degraded appearance when being exposed to rain. But, $B_2O_3$ exceeding 5.0% makes the glass have undesirable milk-white patches in its appearance.

BaO is an additive for improving the melting property of the glass but use of an amount more than 3.0% degrades the chemical resistance of the glass.

ZnO is used for improving the chemical resistance. However, the improvement is not obtained and its appearance is deteriorated by exposure to rain when an amount exceeding 1.0% is used. Use of ZnO more than 5.0% reduces amount of crystals precipitated in the glass so that no opal glass is obtained.

$Na_2O$ is an element for lowering the viscosity at a high temperature to improve the melting property and is also necessary by 15.0% or more for making the sodium sulfide and the sodium sulfate crystals in the glass. However, use of $Na_2O$ more than 21.0% lowers the chemical resistance.

$SO_3$ is used for precipitating the sodium sulfate and sodium sulfide in the glass to obtain the opal glass and is necessary by 0.3% or more therefor. However, use of more than 1.0% makes undesirable milk-white patches in an appearance of the glass.

$F_2$ is an additive for improving the melting property. But, more than 2.0% is not used because milk-white patches is made in an appearance of the glass.

The opal glass can include MgO, $K_2O$ and/or $Li_2O$ by 5% at the maximum. Further, the opal glass can include, by 1% at the maximum, a refining agent or agents such as $As_2O_3$, $Sb_2O_3$ and the like, and a coloring agent or agents such as CoO, NiO and the like.

The opal glass does not include lime and chlorine. When the glass includes lime, the sodium sulfate and/or sodium sulfide particles hardly precipitate in the glass so that the mean light transmittance exceeds 80% not to produce the opal appearance. Inclusion of chlorine should be avoided because chlorine corrodes molds used for producing the glass bricks.

EXAMPLES

Each sample glass of Nos. 1–10 in Table 2 was produced in the following manner.

The batch was weighed in the amounts as shown in Table 2. The batch was melted in a platinum crucible at about 1400° C. for about four hours and then was held about 1200° C. for about one hour. Thereafter, the molten glass was flowed on a carbon plate to form a glass plate. The glass plate was annealed and both surfaces of the glass plate were then polished to obtain a test plate piece having a thickness of 10 mm. The test plate piece was subjected to measurement of mean light transmittance for wavelength over a range of 400–700 μm.

TABLE 2

| INGREDIENT | SAMPLE GLASS NO. | | | | | | | | | |
|---|---|---|---|---|---|---|---|---|---|---|
| (wt %) | 1 | 2 | 3 | 4 | 5 | 6 | 7 | 8 | 9 | 10 |
| $SiO_2$ | 67.0 | 65.9 | 65.9 | 65.9 | 66.5 | 64.9 | 65.5 | 64.8 | 69.1 | 66.0 |
| $Al_2O_3$ | 8.6 | 8.6 | 9.1 | 7.5 | 8.0 | 10.0 | 9.0 | 9.5 | 7.5 | 8.6 |
| $B_2O_3$ | 1.1 | 2.1 | 1.1 | 2.7 | 3.0 | 2.0 | 1.0 | 1.9 | 1.5 | 2.5 |
| BaO | 1.5 | 2.0 | 1.0 | 2.5 | 1.0 | 1.5 | 1.5 | 2.5 | — | 1.6 |
| ZnO | 2.4 | 3.0 | 1.5 | 4.0 | 3.0 | 2.5 | 4.5 | 3.0 | 2.5 | 2.4 |
| $Na_2O$ | 18.1 | 17.1 | 19.9 | 16.0 | 17.0 | 18.0 | 17.5 | 16.5 | 19.1 | 18.1 |
| $SO_3$ | 0.9 | 0.9 | 0.8 | 0.4 | 0.5 | 0.6 | 0.4 | 0.5 | 0.3 | 0.4 |
| $F_2$ | 0.4 | 0.4 | 0.7 | 1.0 | 1.0 | 0.5 | 0.6 | 1.3 | — | 0.4 |
| MEAN TRANSMITTANCE WAVELENGTH OF 400–700 nm (GLASS THICKNESS OF 10 mm) | 43 | 50 | 38 | 65 | 55 | 51 | 60 | 66 | 70 | 60 |
| ELUTED ALUKALI | 0.28 | 0.25 | 0.53 | 0.20 | 0.25 | 0.54 | 0.50 | 0.30 | 0.51 | 0.25 |

TABLE 2-continued

| INGREDIENT | SAMPLE GLASS NO. | | | | | | | | | |
|---|---|---|---|---|---|---|---|---|---|---|
| (wt %) | 1 | 2 | 3 | 4 | 5 | 6 | 7 | 8 | 9 | 10 |
| AMOUNT (mg) | | | | | | | | | | |

Figure 3:
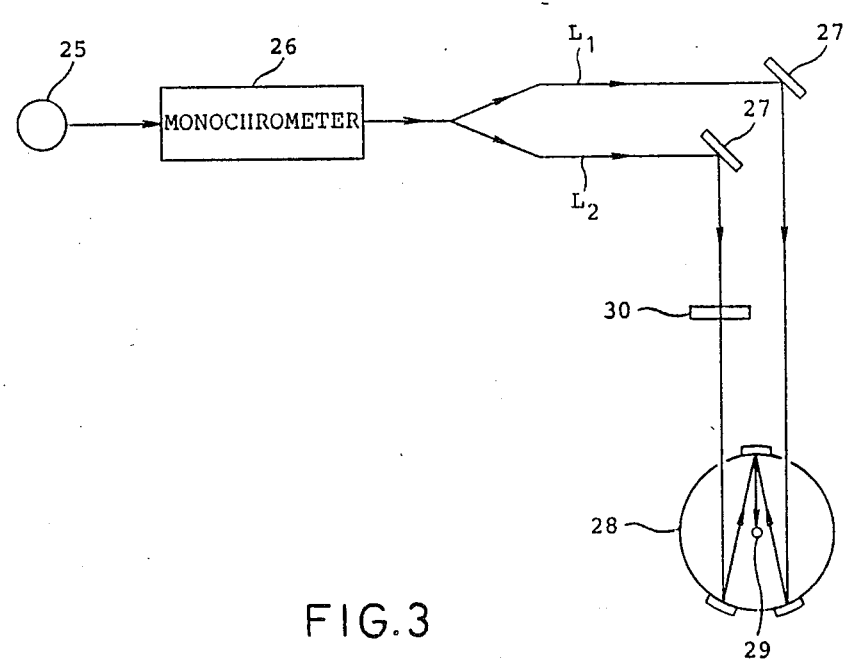
FIG. 3 is a diagramatic view of an apparatus used for measuring light transmittance of a test glass piece for a wavelength.

Referring to FIG. 3, an apparatus is shown which was used for measuring the mean light transmittance of the test plate piece. In the FIGURE, the apparatus comprises a tungsten lamp 25 for emitting a white light ray, a monochrometer 26 for extracting a light of a wavelength from the white light ray to produce a monochroic light beam, a beam splitter (not shown) for splitting the monochroic light beam into two beams $L_1$ and $L_2$, toroidal mirrors 27 for reflecting those monochroic light beams, and an integrating sphere 28 having a photometer 29 at a center of the sphere 28. The monochroic light beams are incident in the sphere 28 after reflected by the mirrors 27, and are reflected in the sphere 28 to be eventually incident to the photometer 29. Thus, illumination of the monochroic light is measured by the photometer. Then, a test piece 30 is disposed in the optical axis of one (for example, $L_2$) of the two monochroic light beams $L_1$ and $L_2$ and the illumination is also measured by the photometer. Thus, the transmittance of the test piece for the monochroic light can be obtained from the illumination data before and after the test piece 30 is disposed on the light beam $L_2$ axis.

Using one having a diameter of 150 mm as the integrating sphere 28, the light transmittance of the test plate piece as the test piece 30 was measured for wavelengths of 400-700 nm at intervals of 1 nm. Then, a mean value of the light transmittance was calculated from the measured data. The mean light transmittance is shown in Table 2.

On the other hand, the molten glass of each sample glass was crushed into powder by putting it into water, and the glass powder was subjected to an alkali elution test determined in the JIS (Japanese Industrial Standard) R 3502-1958 (reaffirmed: 1983).

The eluted alkali amount of each sample glass Nos. 1-10 are shown in Table 2.

Table 2 teaches us that the each of the sample glasses Nos. 1-10 has a high light transmittance such as about 60% and an excellent chemical resistance, that is, a reduced eluted alkali amount such as less than 0.6 mg.

The molten glass of each sample glass was poured into a mold and shaped into a cup-shaped body as shown at 11 and 12 in FIG. 1. The cup-shaped body has a wall thickness of about 10 mm and a dimension of 190 mm×190 mm×50 mm. Two pieces of the body were joined to produce a glass brick as shown at 10 in FIG. 1. The glass brick has a dimension of 190 mm×190 mm×95 mm.

It was confirmed that the produced glass brick was excellent in light diffusibility, in appearance and in lighting property for building lighting wall materials and for partitions in a room.

In order to evaluate light diffusibility of the glass brick, the glass brick made of sample glass No. 10 was subjected to a light transmittance measurement using the apparatus shown in FIGS. 4 and 5.

In the figures, the apparatus comprises an integrating sphere 31 having a photometer 32 mounted on the sphere 31 and a test piece 33 disposed on the sphere 31, and a light source 34. Lens system 35 with a light shielding plate or a flare stop 36 is disposed in a distance between the test piece 33 and the light source 34 and makes a parallel light beam from the light emitted from the light source 34. The parallel light beam is incident to the test piece 33. The integrating sphere 31 has an inner surface which is coated with a light reflecting material excluding portions facing the photometer 32 and the test piece 33.

Light emitted from the light source 34 is incident to the test piece 33 as the parallel right beam through the lens system 35 and injected into the integrating sphere 31 after transmitted through the test piece 33. The injected light is reflected by the inner reflection coating so that the inner surface of the integrating sphere 31 is held at an illuminance. The illuminance can be measured by the photometer 32. In this connection, a light stop 37 is disposed in the sphere 31 between the photometer 32 and the test piece 33 for preventing the transmitting light from being directly incident to the photometer 32 from the test piece 33.

Accordingly, the light transmittance of the test piece 33 can be obtained by comparing illuminance data measured when the test piece 33 is present and when the test piece is absent or is not disposed on the sphere 31.

An illumination photometer was used for the photometer 32 and the glass brick was disposed on the integrating sphere 31 as the test piece 33. As a light source, a xenon lamp was used which emitted a light ray having a constant light strength over a wide wavelength range of 400-700 nm.

The integrating sphere 31 was rotated with the test piece 33 about a central vertical axis A extending in a front surface of the test piece 33 so as to change the light incident angle $\theta_i$ to the test piece as shown in FIG. 5. At various light incident angles, the light transmittance was measured. The measured data are shown by a curve 1 of a solid line in FIG. 6.

Figure 6:
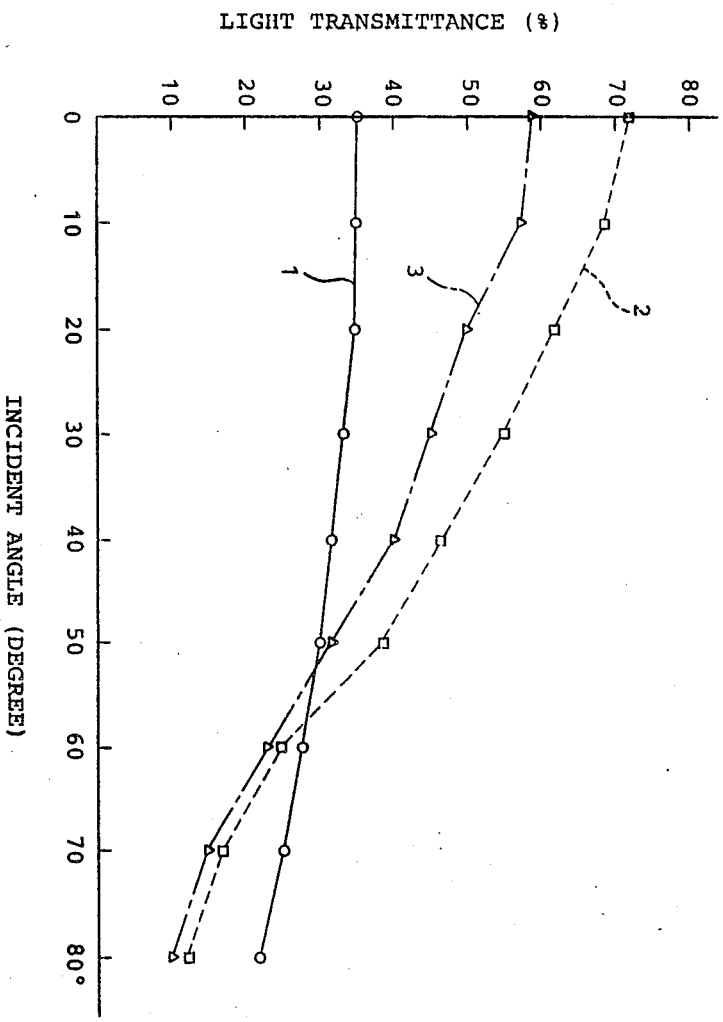
FIG. 6 is a view illustrating a light transmittance response to variation of light incident angle of a glass brick of an example according to an embodiment of the invention.

FIG. 6 also shows the light transmittance response to variation of the light incident angle of other glass bricks of the transparent soda-lime-silica glass with no pattern and with patterns of fine surface irregularity which are shown by a dashed line 2 and a short and long dashed line 3, respectively.

In comparison of curves 2 and 3 with curve 1, it will be understood that the glass brick of sample glass No. 10 according to the present invention has a constant light transmittance over a wide incident angle but the conventional glass bricks decrease in the light transmittance by increase of the incident angle. This means that the present invention has an excellent light diffusibility.

What is claimed is:

1. A translucent glass brick for use in a building wall, said translucent glass brick being a hollow body of glass, the improvement wherein said glass is an opal glass which comprises light transparent glass matrix and fine particles dispersed in said matrix for diffusing light transmitting through said glass, said glass having an opal appearance and a mean light transmittance of 20-80%, in a glass thickness of 10 mm, for wavelength over a range of 400-700 nm.

2. A translucent glass brick as claimed in claim 1, wherein said mean light transmittance of said opal glass is 30–80%.

3. A translucent glass brick as claimed in claim 1, wherein said opal glass is a lime and chlorine free glass with sodium sulfate and sodium sulfide as said fine particles.

4. A translucent glass brick as claimed in claim 3, wherein said glass essentially consists, by weight, of $SiO_2$ 60.0–70.0%, $Al_2O_3$ 7.0–11.0%, $B_2O_3$ 1.0–5.0%, BaO 0–3.0%, ZnO 1.0–5.0%, $Na_2O$ 15.0–21.0%, $SO_3$ 0.3–1.0%, and $F_2O$ 0–2.0%.

* * * * *